(No Model.)
W. F. CLARE.
TRAVELER FOR APPARATUS FOR RAISING AND MOVING MATERIAL.
No. 563,448. Patented July 7, 1896.
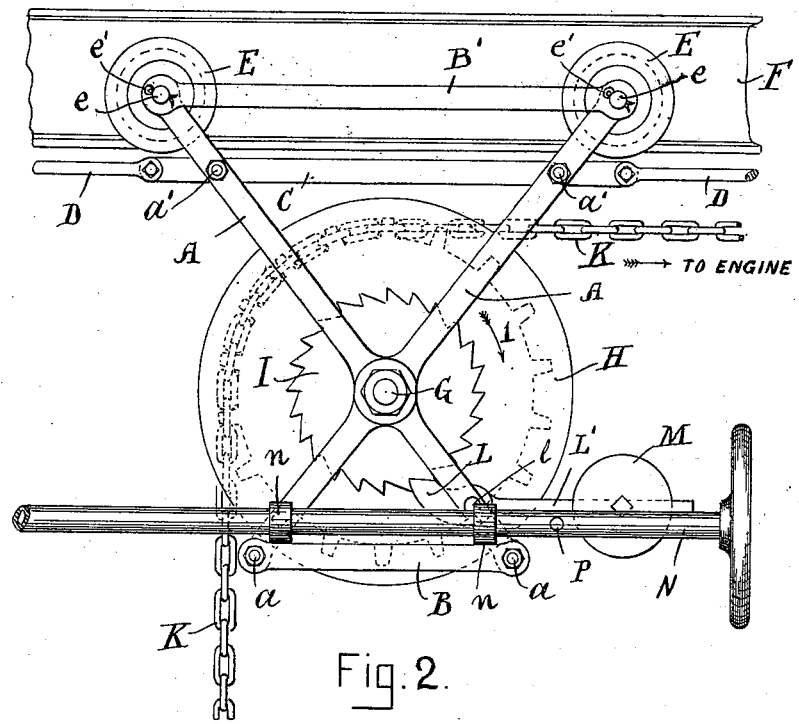
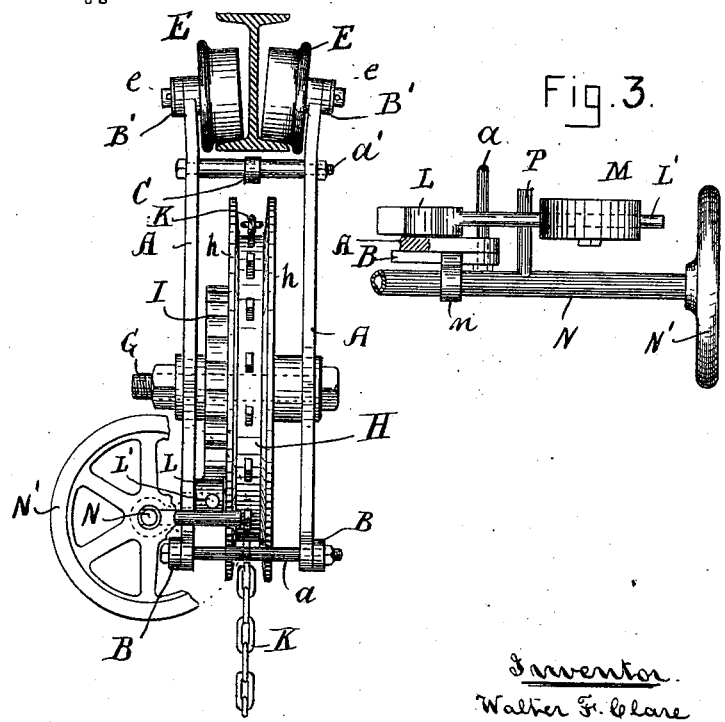
Witnesses.
Edward D. Brown
Laura E. Hayward
Inventor.
Walter F. Clare
by Edwin Planta.
Attorney.

UNITED STATES PATENT OFFICE.

WALTER F. CLARE, OF MEDFORD, MASSACHUSETTS.

TRAVELER FOR APPARATUS FOR RAISING AND MOVING MATERIAL.

SPECIFICATION forming part of Letters Patent No. 563,448, dated July 7, 1896.

Application filed November 24, 1894. Serial No. 529,841. (No model.)

*To all whom it may concern:*

Be it known that I, WALTER F. CLARE, a subject of the Queen of Great Britain, residing at Medford, in the county of Middlesex and State of Massachusetts, have invented certain new and useful Improvements in Travelers for Apparatus for Raising and Moving Materials, of which the following, taken in connection with the accompanying drawings, is a specification.

My invention relates to travelers for apparatus employed for raising and moving materials from place to place; and the invention consists in certain details of construction, as hereinafter fully described, and pointed out in the claim.

Referring to the accompanying drawings, Figure 1 represents a side view of a traveler embodying my invention as supported from a track. Fig. 2 is an end view of the same, and Fig. 3 is a detail view.

A A represent two side frames secured together the required distance apart by bolts $a\ a'$. The lower arms of the frames are prevented from spreading by spacer-bars B, secured to the ends thereof by the bolts $a$, and the upper ends are also prevented from spreading by similar bars B'.

E are flanged wheels secured to short axles $e$, which pass through the ends of the upper arms and also through the ends of the spacer-bars B', and are secured by a split pin $e'$ or other suitable means. The wheels E run upon an elevated track F. (Shown in the drawings of I form.)

C is a central draw-bar mounted upon the bolts $a'$. Each end of this bar is provided with a hole, to which a rod D or other connection can be attached to connect and draw the travelers along when more than one traveler is employed.

At the junction of the arms of the side frames is secured a bolt G, upon which is mounted a flanged sprocket-wheel H and ratchet-wheel I, which are secured to each other and are free to rotate upon the said bolt G in the direction of the arrow 1 when a load is to be lifted by the chain K, (the load being attached to the lower end of said chain,) but is prevented from turning in the opposite direction by a pawl L, mounted upon a stud $l$, secured to one of the side frames A. Upon the tail L' of this pawl is mounted a weight M to hold the pawl in contact with the teeth of the ratchet-wheel I. (The weight is shown in Figs. 1 and 3, but not in Fig. 2.)

In order to release the pawl L from contact with the ratchet-teeth, so that the sprocket-wheel may turn in the opposite direction to lower the chain K, a pipe or rod N is mounted in bearings $n$, secured to or formed in one with one of the side frames A. To this pipe or rod N is attached a short arm P, that extends under the pawl tailpiece L', so that when the pipe or bar N is turned by means of the wheel N' the arm P will raise the tailpiece L' and thus throw the pawl L out of contact with the ratchet-teeth. The sprocket-wheel can then turn in the reverse direction so long as the tailpiece is held up, and when the pipe or bar N is turned to lower the arm P the weight M will cause the pawl to again engage with the ratchet-wheel and prevent the chain from descending. When more than one traveler is employed, the pipe or rod N of one traveler would be attached to the next traveler by a pipe or rod, the connections between the pipes or rods being made by universal joints in order to allow the train to pass around curves.

The sprocket-wheel H is formed with side flanges $h$, so that when more than one traveler is employed the chains of the rear travelers will be supported and guided over the chains of the travelers that are in advance.

What I claim is—

In an apparatus for raising and moving material, a sprocket-wheel and a ratchet-wheel mounted between two side frames adapted to travel on an overhead track, a pawl for holding said ratchet-wheel and a pipe mounted in bearings on one of the side frames and having an arm that passes under the tail of the pawl, and a wheel on said pipe whereby it can be rotated to cause the arm to raise the tailpiece and throw the pawl out of contact with the ratchet-wheel substantially as set forth.

In testimony whereof I have signed my name to this specification, in the presence of two subscribing witnesses, on this 3d day of July, A. D. 1894.

WALTER F. CLARE.

Witnesses:
CHAS. STEERE,
EDWIN PLANTA.